United States Patent [19]
Palfenier et al.

[11] Patent Number: 5,590,565
[45] Date of Patent: Jan. 7, 1997

[54] MOTOR VEHICLE STEERING COLUMN

[75] Inventors: Samuel R. Palfenier, El Paso, Tex.; Frank R. Keipert, Bay City, Mich.; Howard D. Beauch; Leland N. Olgren, both of Frankenmuth, Mich.; William D. Cymbal, Freeland, Mich.

[73] Assignee: General Motors Corporation, Detroit, Mich.

[21] Appl. No.: 385,490

[22] Filed: Feb. 8, 1995

[51] Int. Cl.$^6$ ........................................................... B62D 1/18
[52] U.S. Cl. ................................................. 74/493; 74/531
[58] Field of Search ...................... 74/493, 531; 280/775, 280/777

[56] References Cited

U.S. PATENT DOCUMENTS

| | | | |
|---|---|---|---|
| 3,252,350 | 11/1963 | Zeigler | 74/493 |
| 3,342,080 | 4/1966 | Cantleberry | 74/493 |
| 3,396,600 | 8/1968 | Zeigler et al. | 74/493 |
| 4,667,530 | 5/1987 | Mettler et al. | 74/493 |
| 4,691,587 | 9/1987 | Farrand et al. | 74/493 |
| 4,774,851 | 10/1988 | Iwanami et al. | 74/493 |
| 4,796,481 | 1/1989 | Nolte | 74/493 |
| 4,900,059 | 2/1990 | Kinoshita et al. | 280/775 |
| 4,972,732 | 11/1990 | Venable et al. | 74/493 |
| 5,035,446 | 7/1991 | Arvidsson | 74/493 |

*Primary Examiner*—Charles A. Marmor
*Assistant Examiner*—David Fenstermacher
*Attorney, Agent, or Firm*—Saul Schwartz

[57] ABSTRACT

A motor vehicle steering column having power adjustment of the horizontal and vertical positions of a steering wheel on an end of the steering column including an adjustable tubular mast jacket on which the steering wheel is supported, a stationary tubular mast jacket, and a self-adjusting slide bearing between the stationary and adjustable mast jackets. The self-adjusting slide bearing includes a support tube on the stationary mast jacket, pair of inward facing frustoconical seats on the support tube, a pair of plastic split sleeve bearings slidably mounted on the adjustable mast jacket each having an outward facing frustoconical side, and a tubular spring between the split sleeve bearings biasing the latter toward converging annuluses defined between the frustoconical seats and the adjustable mast jacket for lash-free sliding support of the adjustable mast jacket on the stationary mast jacket. In a preferred embodiment, the tubular spring is a plastic sleeve having a plurality of circumferential slots separated by a plurality of webs which resiliently flex in the length direction of the sleeve.

5 Claims, 2 Drawing Sheets

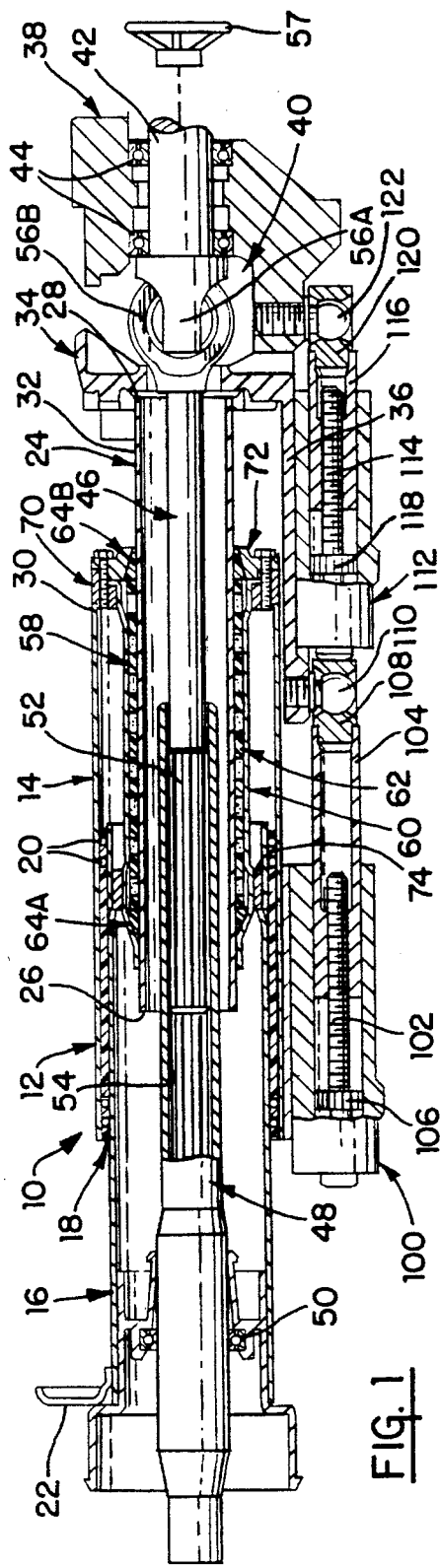

1

MOTOR VEHICLE STEERING COLUMN

FIELD OF THE INVENTION

This invention relates to motor vehicle steering columns.

BACKGROUND OF THE INVENTION

U.S. Pat. No. 3,396,600, issued 13 Aug. 1968 and assigned to the assignee of this invention, describes a motor vehicle steering column having power adjustment of the horizontal and the vertical positions of a steering wheel on an end of the column. For horizontal adjustment, i.e. "in and out", the steering column includes an adjustable tubular mast jacket on which the steering wheel is supported, a stationary tubular mast jacket having a plurality of raised dimples which define simple slide bearings for the adjustable mast jacket, and a motor driven screw-type linear actuator between the stationary and adjustable mast jackets for moving the adjustable mast jacket in and out relative to the stationary mast jacket. For vertical adjustment, i.e. "up and down", the steering wheel includes a second screw-type linear actuator between the adjustable mast jacket and a tilt housing thereon on which the steering wheel is rotatably supported for pivoting the tilt housing in a vertical plane containing the centerline of the steering column.

SUMMARY OF THE INVENTION

This invention is a new and improved motor vehicle steering column having power adjustment of the horizontal and vertical positions of a steering wheel on an end of the steering column including an adjustable tubular mast jacket on which the steering wheel is supported, a stationary tubular mast jacket, and a self-adjusting slide bearing between the stationary and adjustable mast jackets which permanently maintains substantially zero radial clearance, i.e. "lash", therebetween. The self-adjusting slide bearing includes a support tube on the stationary mast jacket, pair of inward facing frustoconical seats on the support tube, a pair of plastic split sleeve bearings slidably mounted on the adjustable mast jacket each having an outward facing frustoconical side, and a tubular spring between the split sleeve bearings biasing the latter toward converging annuluses defined between the frustoconical seats and the adjustable mast jacket for lash-free sliding support of the adjustable mast jacket on the stationary mast jacket. In a preferred embodiment, the tubular spring is a plastic sleeve having a plurality of circumferential slots separated by a plurality of webs which resiliently flex in the length direction of the sleeve. The steering wheel is rotatably mounted on a tilt housing which is attached to an outboard end of the adjustable mast jacket for pivotal movement in a vertical plane containing the centerline of the steering column. Motor driven screw-type linear actuators between the stationary and adjustable mast jackets and between the adjustable mast jacket and the tilt housing effect power horizontal and vertical adjustment, respectively, of the position of the steering wheel.

BRIEF DESCRIPTION OF THE DRAWINGS

FIG. 1 is a fragmentary longitudinal sectional view of a motor vehicle steering column according to this invention;

FIG. 2 is an enlarged view of a portion of FIG. 1;

DESCRIPTION OF A PREFERRED EMBODIMENT

Figure 3:
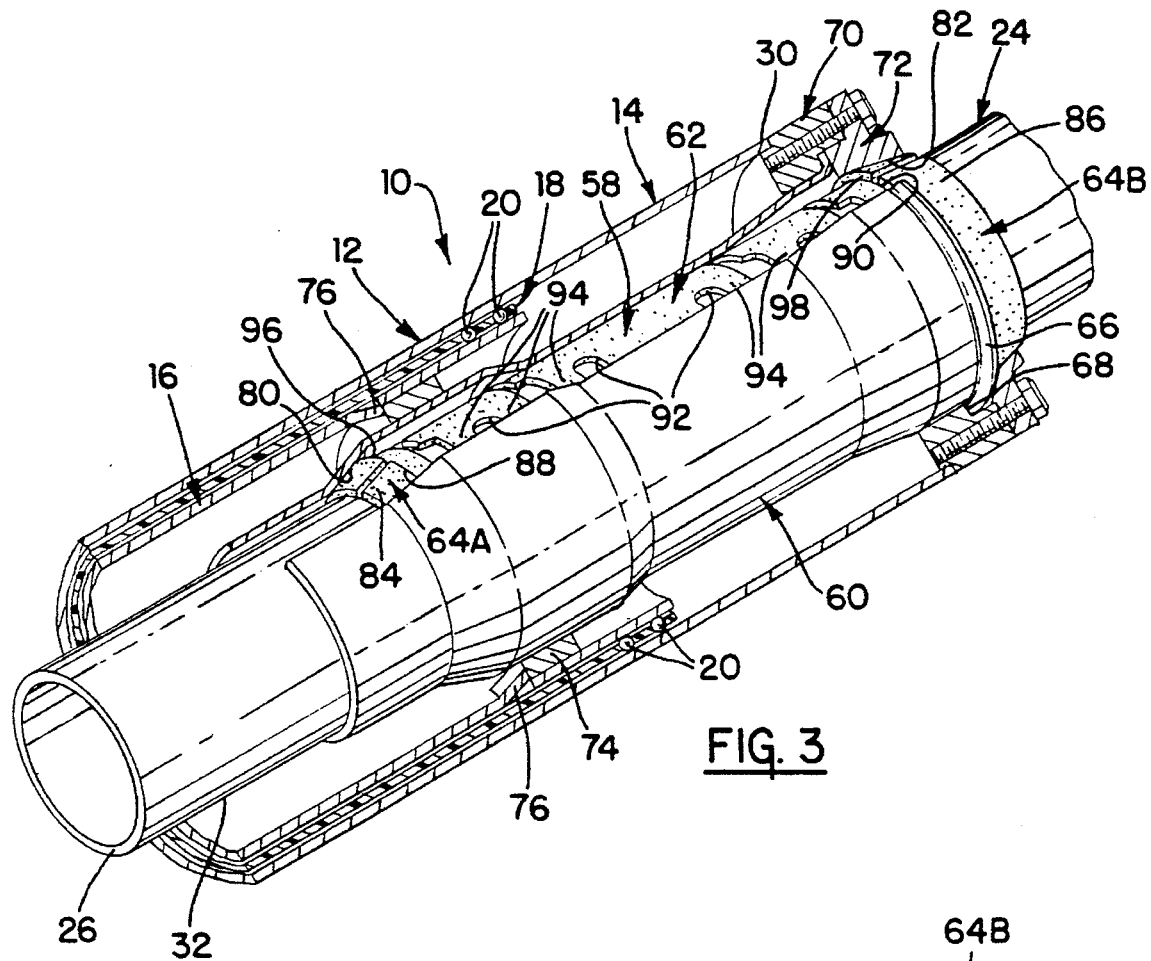
FIG. 3 is a fragmentary, broken-away perspective view of a portion of FIG. 1.

Referring to FIG. 1, a motor vehicle steering column 10 according to this invention includes a stationary mast jacket 12 consisting of an upper tube 14, a lower tube 16 telescoped inside the upper tube, a tubular ball sleeve 18 in the annulus between the upper and lower tubes, and a plurality of roll deformers 20 in pockets in the ball sleeve interference fit between the upper and lower tubes 14, 16. A bracket 22 on the lower tube defines an anchor for the stationary mast jacket on a vertical panel, not shown, constituting the forward wall of a passenger compartment of a motor vehicle. A bracket, not shown, on the upper tube is releasably connected to body structure within the passenger compartment. In a collapse event of the steering column, the upper tube separates from the body structure of the vehicle and the roll deformers 20 absorb energy as described in U.S. Pat. No. 3,392,599, issued 16 Jul. 1968 and assigned to the assignee of this invention, as the upper tube strokes telescopically down over the lower tube.

The steering column 10 further includes a tubular adjustable mast jacket 24 inside the stationary mast jacket 12 having an inboard end 26, an outboard end 28, FIG. 1, outside of an outboard end 30 of the upper tube 14, and a plain cylindrical outer wall 32. A tilt housing support 34 is rigidly attached to the adjustable mast jacket at the outboard end 28 thereof. A skirt 36 on the tilt housing support 34 longitudinally overlaps and partially surrounds the upper tube 14. Trunnions, not shown, on the tilt housing support 34 cooperate with similar trunnions, not shown, on a tilt housing 38 of the steering column in mounting the tilt housing on the tilt housing support for up and down pivotal movement in a vertical, longitudinal centerplane of the steering column.

A steering shaft 40 of the steering column 10 includes an upper solid shaft 42 rotatably mounted on the tilt housing 38 by a pair of bearings 44, a lower solid shaft 46, and a lower tubular shaft 48 rotatably supported on the lower tube 16 of the stationary mast jacket by a bearing 50. The lower solid shaft has a splined end 52 telescoped inside a splined end 54 of the lower tubular shaft. A pair of yokes 56A–B on the upper and lower solid shafts, respectively, cooperate with a slotted ball, not shown, therebetween in defining a universal joint through which the upper solid shaft is connected to the lower solid shaft for unitary rotation and for up and down pivotal movement in the aforesaid vertical plane. A schematically represented steering wheel 57 of the steering column 10 is rigidly attached to the upper solid shaft 42 at a distal end of the latter.

The adjustable mast jacket 24 is slidably mounted on the stationary mast jacket 12 for horizonal or "in and out" adjustment of the position of the steering wheel by a self-adjusting slide bearing 58. The slide bearing 58 includes a support tube 60 in the annulus between the adjustable mast jacket 24 and the stationary mast jacket 12, a tubular spring 62 in the annulus between the adjustable mast jacket 24 and the support tube, and a pair of plastic split sleeve bearings 64A–B at opposite ends of the tubular spring 62.

The support tube has a lip 66 at one end which seats against an annular shoulder 68 on a mounting ring 70 rigidly attached to the upper tube 14 at the outboard end 30 thereof. The lip 66 is captured between the shoulder 68 and a retaining ring 72 bolted to the mounting ring 70 whereby the support tube 60 is rigidly attached to the upper tube 14. An annular bushing 74 between the lower tube 16 and the support tube 60 seats against a plurality of tangs 76 on the lower tube and cooperates with the mounting ring 70 in centering the support tube inside the stationary mast jacket 12.

Figure 4:
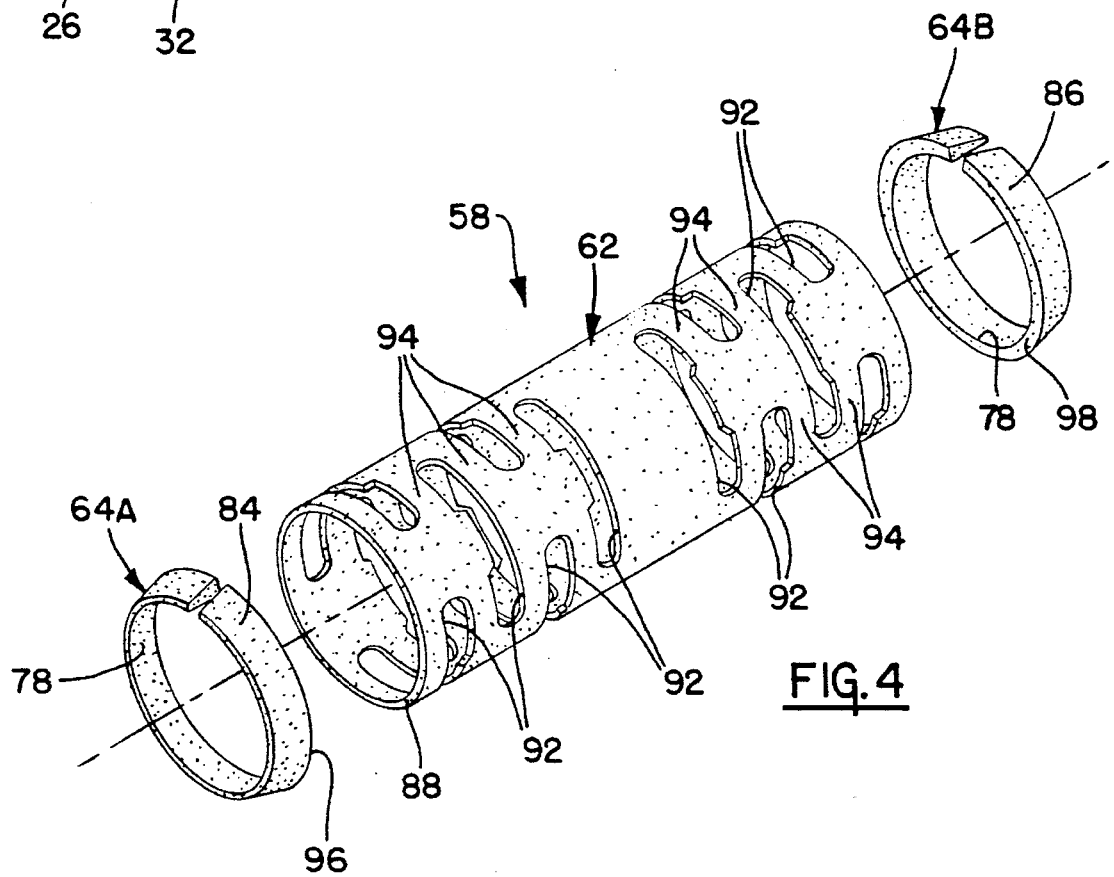
FIG. 4 is an exploded perspective view of a portion of FIG. 3.

Each of the plastic split sleeve bearings 64A–B is disposed around the adjustable mast jacket with a plain cylindrical side 78 thereof, FIG. 4, slidably bearing against the cylindrical outer wall 32 of the adjustable mast jacket. The sleeve bearings are preferably made of a plastic which exhibits a low coefficient of friction when resiliently urged against the cylindrical outer wall 32 as described below.

An inward facing frustoconical seat 80 is defined on the support tube 60 at the end thereof opposite the lip 66. The retaining ring 72 has an inward facing frustoconical seat 82 thereon facing the frustoconical seat 80 on the support tube. The split sleeve bearing 64A has a frustoconical side 84 facing the frustoconical seat 80 on the support tube. The split sleeve bearing 64B has a frustoconical side 86 facing the frustoconical seat 82 on the retaining ring 72.

The tubular spring 62 is a plastic sleeve having a first end 88, a second end 90, and a plurality of circumferential slots 92 which extend part way around the sleeve and which are staggered such that a plurality of lateral webs 94, FIG. 4, are defined on the sleeve. The webs 94 flex resiliently when the ends 88, 90 are forced toward each other. The first end 88 of the sleeve bears against an annular end 96 of the first split sleeve bearing 64A. The second end 90 of the sleeve bears against an annular end 98 of the second split sleeve bearing 64B.

The length of the tubular spring 62 is calculated to exceed the space between the split sleeve bearings 64A–B when the retaining ring 72 is bolted to the mounting ring 70 on the upper tube 14. The spring 62, therefore, continuously biases the sleeve bearings in opposite directions into the converging annuluses defined between the frustoconical seats 80, 82 and the outer wall 32 of the adjustable mast jacket. The frustoconical seats circumferentially compress the sleeve bearings and effect continuous, lash-free engagement of the cylindrical sides 78 of the split sleeve bearings against the cylindrical outer wall 32 of the adjustable mast jacket. The slide bearing 58 is, therefore, self-adjusting during the operational life of the steering column as repeated cycles of horizontal adjustment of the position of the steering wheel abrades the cylindrical sides 78 of the split sleeve bearings.

As seen best in FIG. 1, a first screw-type linear actuator 100 is rigidly attached to the upper tube 14 and includes a screw 102 and a slider 104. A reversible electric motor, not shown, rotates the screw 102 through a pinion gear 106 thereon. The slider 104 is restrained against rotation relative to the screw and has a socket 108 thereon which receives the head of a ball stud 110 rigidly mounted on the skirt 36 of the tilt housing support 34 on the adjustable mast jacket 24. The screw 102 is received in a threaded bore in the slider 104 such that rotation of the screw in opposite directions shifts the adjustable mast jacket in and out to effect horizontal adjustment of the position of the steering wheel.

Similarly, a second screw-type linear actuator 112 is mounted on the skirt 36 of the tilt housing support 34 and includes a screw 114 and a slider 116. A reversible electric motor, not shown, rotates the screw 114 through a pinion gear 118 thereon. The slider 116 is restrained against rotation relative to the screw and has a socket 120 thereon which receives the head of a ball stud 122 rigidly mounted on the tilt housing 38 in the aforesaid vertical plane. The screw 114 is received in a threaded bore in the slider 116 such that rotation of the screw in opposite directions pivots the tilt housing up and down in the aforesaid vertical plane.

The lead of the screws 102, 114 and/or the gear ratio between the electric motors and the pinions 106, 118 is calculated to prevent the screws from being back driven in the event of an impact on the steering wheel urging telescopic energy absorbing collapse of the steering column. In that circumstance, the linear actuators operate as rigid links between the tilt housing 38 and the upper tube 14 so that the tilt housing and the adjustable mast jacket 24 collapse as a unit with the upper tube 14 relative to the lower tube 16.

The embodiments of the invention in which an exclusive property or privilege is claimed are defined as follows:

1. A motor vehicle steering column comprising:

a tubular stationary mast jacket, a tubular adjustable mast jacket inside said stationary mast jacket, a steering wheel, means rotatably mounting said steering wheel on said tubular adjustable mast jacket, and a self-adjusting bearing means mounting said tubular adjustable mast jacket on said tubular stationary mast jacket with continuously substantially zero lash therebetween for in and out bodily movement to effect horizontal adjustment of the position of said steering wheel relative to said stationary mast jacket including a pair of inward facing frustoconical seats on said tubular stationary must jacket around said tubular adjustable mast jacket, a pair of split sleeve bearings each having and annular end and a cylindrical side slidably bearing against a cylindrical outer wall on said tubular adjustable mast jacket and a frustoconical side facing a respective one of said pair of inward facing frustoconical seats on said tubular stationary mast jacket, and a tubular spring consisting of a plastic sleeve having a pair of opposite ends bearing against respective ones of said annular ends of said pair of split sleeve bearings and a plurality of circumferential slots defining therebetween a plurality of resiliently flexible webs, said tubular spring biasing each of said pair of split sleeve bearings into respective ones of a pair of converging annuluses defined between said pair of inward facing frustoconical seats and said cylindrical outer wall on said tubular adjustable mast jacket.

2. The motor vehicle steering column recited in claim 1 further comprising:

a support tube in an annulus between said tubular stationary mast jacket and said tubular adjustable mast jacket having a surface thereof defining a first one of said pair inward facing frustoconical seats and an annular lip formed at an end thereof, a mounting ring on said stationary mast jacket, and a retaining ring having a surface thereof defining a second one of said pair of inward facing frustoconical seats and rigidly attached to said mounting ring with said lip on said support tube therebetween whereby said support tube is rigidly attached to said stationary mast jacket.

3. The motor vehicle steering column recited in claim 2 further comprising:

a first linear actuator means disposed between said tubular stationary mast jacket and said tubular adjustable mast jacket operative to move said tubular adjustable mast jacket in and out relative to said tubular stationary mast jacket to adjust the horizontal position of said steering wheel.

4. The motor vehicle steering column recited in claim 3 wherein said means rotatably mounting said steering wheel on said tubular adjustable mast jacket includes:

a tilt housing mounted on a outboard end of said tubular adjustable mast jacket for pivotal movement in a vertical longitudinal centerplane of said steering column, a solid steering shaft having one end rigidly connected to said steering wheel, and bearing means rotatably mounting said solid steering shaft on said tilt housing.

5. The motor vehicle steering column recited in claim 4 further comprising:

a second linear actuator means disposed between said tubular adjustable mast jacket and said tilt housing operative to pivot said tilt housing up and down in said vertical longitudinal centerplane of said steering column.

* * * * *